July 24, 1956     I. B. LASKOWITZ     2,756,007
JET-POWERED CONVERTIBLE AIRCRAFT
Filed Feb. 20, 1951     3 Sheets-Sheet 3
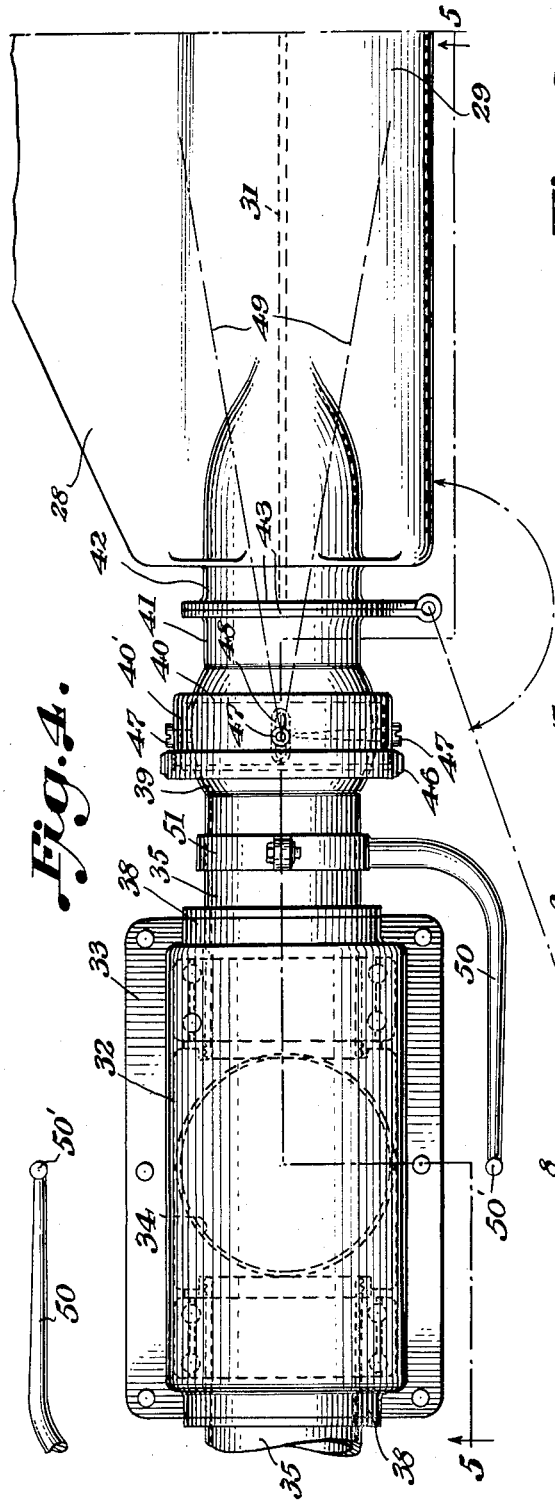
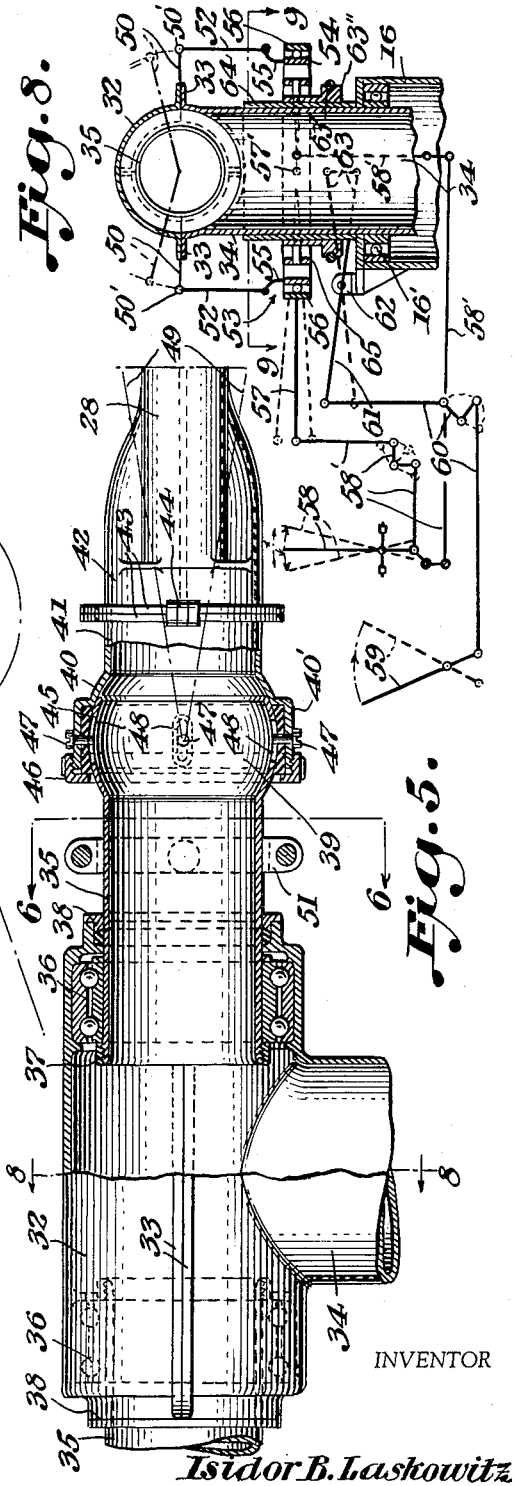
INVENTOR
*Isidor B. Laskowitz*
BY
*Robert J. Dennison*
ATTORNEY

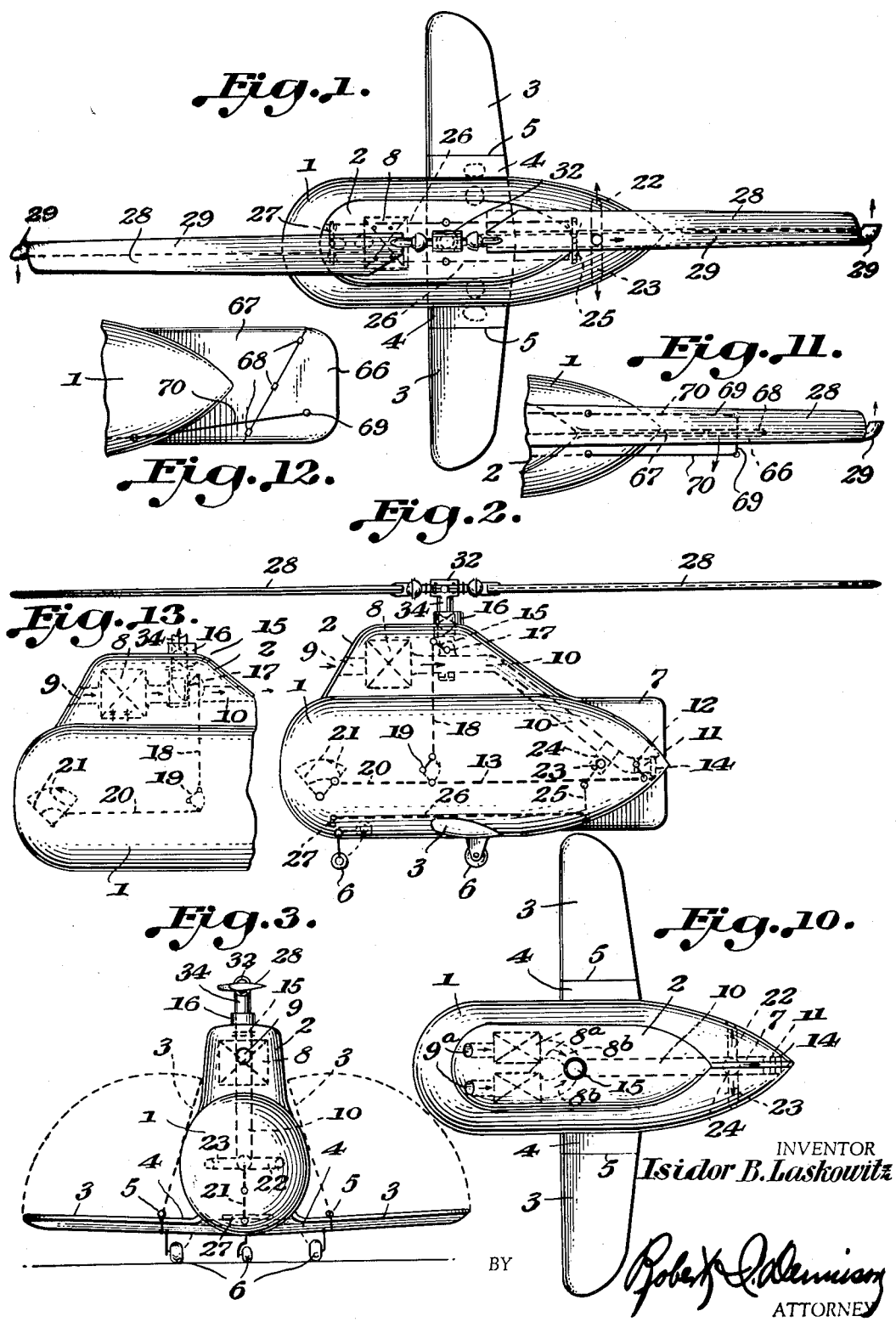

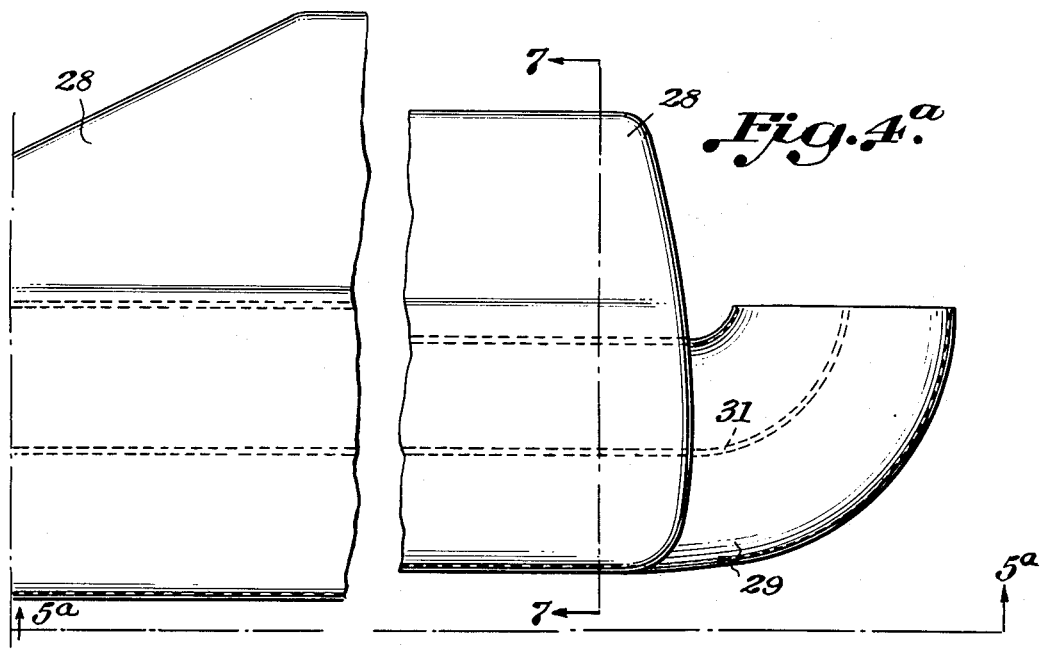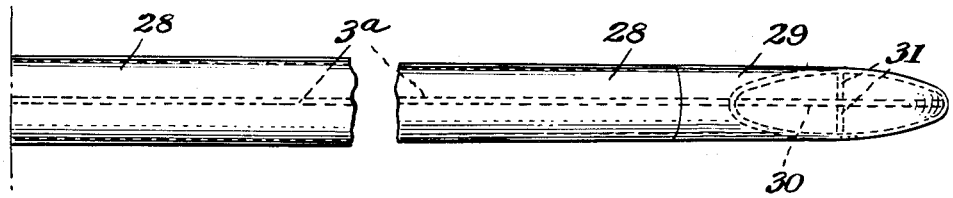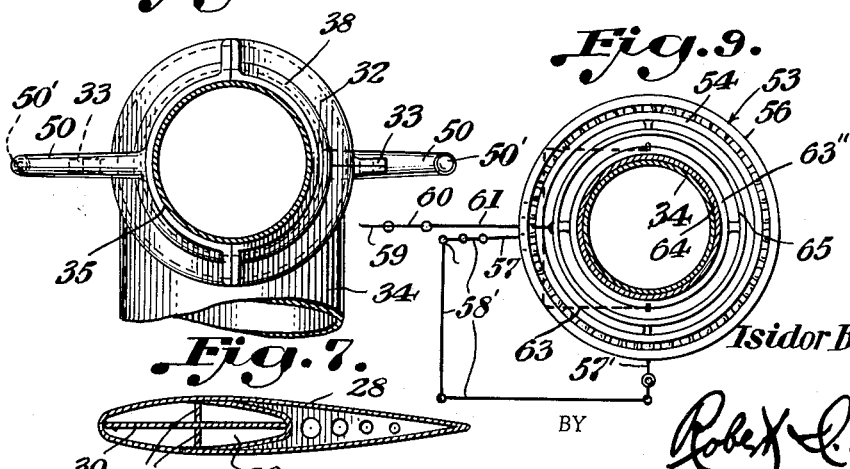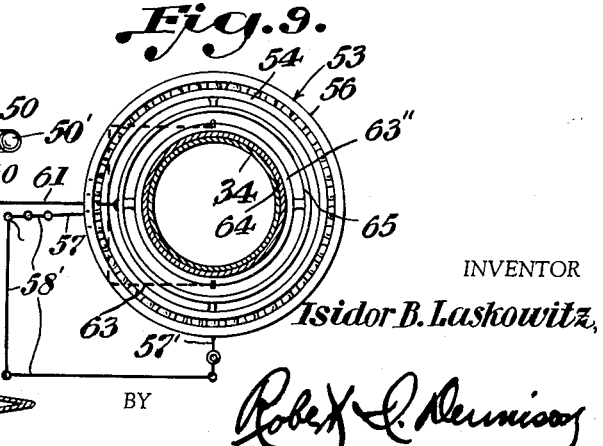

United States Patent Office 2,756,007
Patented July 24, 1956

2,756,007

JET-POWERED CONVERTIBLE AIRCRAFT

Isidor B. Laskowitz, Brooklyn, N. Y.

Application February 20, 1951, Serial No. 211,903

6 Claims. (Cl. 244—7)

This invention relates to jet-powered convertible aircraft, and embodies certain improvements in the jet-powered rotor system for helicopters and control means therefor as covered by my copending application bearing Serial Number 15,916, filed March 19, 1948, now U. S. Patent No. 2,552,008 of May 5, 1951.

The state of the art of helicopter design is such that there are limitations in the maximum forward speed obtained because of the compressibility effects of the advancing blades and the stall effects of the retreating blades of the rotor or rotors.

It is a primary object of this invention, utilizing jet power as distinguished from mechanical drive or power, to provide an aircraft that has all the characteristics and advantages of a helicopter and yet when desired has the ability to utilize the characteristics and advantages of the fixed-wing aircraft in obtaining greater speeds; this conversion taking place in a simple manner by merely shifting a lever.

Another object of the invention is to provide an aircraft with rotary airfoils, wings or blades that will readily and easily ascend vertically or inclined, descend vertically or inclined, move to the right or left, forward or rearward; hover or stay suspended in the air without movement relative to the ground; provide controlling or adjusting mechanisms for maintaining lateral balance or stability, longitudinal balance or stability, and for steering or directional movement about the vertical axis of the aircraft; and provide for autorotation of the rotor or rotors should the engine fail, thus effecting descent safely without power.

A further object of the invention is to provide an aircraft with fixed wings in conjunction with a controllable forward thrust that will carry a substantial part of the weight of the aircraft when desired thus relieving the load on the rotor or rotors and providing for higher forward speeds of the craft.

Another object of the invention is to provide a convertible aircraft in which the power driving the rotor and the power made available for producing a forward thrust in conjunction with a fixed wing are controllable and interconnected one to another to assure proper functioning of the craft.

Another object of the invention is to provide a convertible aircraft in which an afterburner grid is installed in the additional forward thrust exhaust tube, over which fuel may be spread when desired to increase the forward thrust component which in conjunction with the fixed wing will provide higher forward speeds.

Another object of the invention is to provide a convertible aircraft having all the qualifications above noted and yet be of such a compact nature as to occupy a small operating and storage area horizontally and eliminating all auxiliary propellers, rotors or other devices.

Other objects and advantages of the present invention will become apparent from the following detailed description of a preferred embodiment of the invention illustrated in the accompanying drawings wherein like reference characters designate corresponding parts throughout the several views and wherein:

Figure 1 is a top plan view of a convertible aircraft embodying my invention.

Figure 2 is a side view of the improved aircraft.

Figure 3 is a front elevation thereof.

Figure 4 is a fragmentary view upon an enlarged scale looking down upon the rotor head and the inner end portion of one of the blades or air foils.

Figure 4ᵃ is a continuation of the blade or foil shown in Figure 4.

Figure 5 is a view partially in section and partially in elevation taken along the line 5—5 of Figure 4.

Figure 5ᵃ is a continuation of Figure 5 and constitutes a view looking at the front of Figure 4ᵃ and taken along the line 5ᵃ—5ᵃ, of Figure 4ᵃ.

Figure 6 is a transverse sectional view taken along the line 6—6 of Figure 5.

Figure 7 is a transverse sectional view taken along the line 7—7 of Figure 4ᵃ.

Figure 8 is a sectional view taken vertically through the rotor head and associated parts along the line 8—8 of Figure 5, operating mechanism being diagrammatically indicated.

Figure 9 is a transverse sectional view taken along the line 9—9 of Figure 8.

Figure 10 is a top plan view of an aircraft having two engines, the air foils or blades being omitted.

Figure 11 is a fragmentary top plan view of the rear end portion of an aircraft having a vertical stabilizer carrying a rudder.

Figure 12 is a side view of Figure 11.

Figure 13 is a side view of the front end portion of an aircraft having its exhaust pipe or tube discharging through the rear end of the engine compartment instead of through the rear end of the fuselage.

This improved aircraft has a fuselage 1 which may be of any dimensions desired and carrying an engine compartment or dome 2 which extends longitudinally of the fuselage and is of less width than the fuselage. Wings 3 extend from opposite sides of the fuselage and have fixed inner end sections 4 to which the main wing sections are hinged at 5 in order that the wings may be swung vertically from an extended position for use to a folded position against sides of the fuselage, as indicated by dotted lines in Figure 3. There has also been provided conventional landing gear 6 which is preferably retractable so that air resistance will be reduced during flight.

The landing gear has been shown of the type used upon land planes, but it will be understod that other types of landing gear may be provided such as pontoons at outer ends or tips of the wings to stabilize an aircraft landing upon water. A vertical stabilizer 7 having upper and lower sections has been shown in Figure 2 and it will be understood that other conventional equipment may be used.

Within the dome or compartment 2 is an engine 8 of the turbo jet type having an inlet 9 opening through the front wall of the compartment and extending into the engine, and from this engine extends an exhaust pipe or tube 10 which extends towards the rear end of the chamber and then downwardly into the fuselage and towards the rear end thereof where it terminates in a discharge nozzle 11. Discharge of propelling fluid from the rear end of the pipe is controlled by a valve 12 actuated by a rod or link 13, and at the rear end of the nozzle is a grid 14 which may be referred to as an afterburner and serves to impart added propelling force to the jet discharged from the exhaust pipe.

A branch pipe 15 extends upwardly from the exhaust pipe near the engine and under a collar 16 rising from the top of the engine dome or chamber, and flow of propelling fluid through this branch pipe is controlled by a valve 17 actuated by a rod or link 18. The rods 13 and 18 are pivoted to the arms of a bellcrank lever 19 to which is attached the rear end of a rod 20 which has its front end connected with a lever or handle 21 within reach of the operator of the aircraft. The valves 12 and 17 are of the butterfly type and when valve 12 is closed valve 17 is opened, the two valves being simultaneously moved to adjusted positions by movement of the lever 21.

Tubes 22 and 23 for discharging steering jets from the exhaust pipe extend from opposite sides thereof and are connected with the exhaust pipe by a coupling consisting of a three-way valve 24 actuated by a handle or lever 25 to which are attached cables 26 having their front ends connected with opposite ends of a steering bar or lever 27. By pushing upon this bar with his feet the operator may adjust the valve 24 and shut off flow of fluid through both steering tubes or allow discharge of a steering jet through a predetermined steering tube 22 or 23 according to which direction a turn is to be made.

Instead of obtaining power from one engine two may be used if so desired. Such an arrangement of parts is shown in Figure 10 wherein the two engines 8a having intake pipes 9a are mounted in side by side relation to each other in the forward portion of the engine compartment, dome or chamber and have discharge pipes 8b connected with the main discharge pipe 10.

In order that the aircraft may be operated as a helicopter there have been provided airfoils or blades 28 which are of hollow metal formation and gradually reduced in thickness from their entering edges to their trailing edges, as shown in Figure 7. Tubes 29, which are elliptical in cross section, extend longitudinally through the hollow blades for their full length and are braced by webs horizontally extending webs 30 and vertical webs 31. Outer end portions of the tubes 29 project from ends of the blades and are curved in the direction of their trailing edges so that jets discharged from these tubes will impart turning movement to the rotor, of which the blades constitute elements.

The hub or head 32 of the rotor has upper and lower sections which are detachably secured together by fasteners passed through openings in their flanges 33. A tubular neck or shank 34 extends downwardly from the lower section of the rotor head midway of its length and into the collar 16 where it is rotatably mounted by a bearing 16'. This neck has its lower end in telescoping engagement through suitable stuffing box (not shown) with the vertical branch pipe 15 and when the valve 17 is open fluid may enter the rotor head through its neck and pass out through the tubular stub shafts or inner sections 35.

The stub shafts 35 are rotatably mounted through opposite ends of the cylindrical rotor head 32 in bearings 36, which also serve as thrust bearings, and sections 35 are held against outward displacement by nuts 37. Packing glands 38 allow turning of the stub shafts or sections but prevent escape of fluid about them during operation of the aircraft. A hollow, partially spherical head or joint 39, which is open at inner and outer ends, is formed at the outer end of each stub shaft and fits into a similarly shaped socket 40 formed about the intermediate section 41 of the shank or outer section 42 which is integral with its blade 28. As the shanks or sections of the blades are tubular and communicate with inner ends of the tubes 29, fluid entering the rotor head and flowing through the stub shafts or sections may pass through the shanks or sections into the tubes 29 and flow through the tubes until discharged from outer ends thereof in the form of jets which impart rotary motion to the rotor and cause them to exert lifting force which will raise the aircraft at the start of a flight and maintain it in the air at a desired altitude.

It is, of course, understood that the speed at which the rotor rotates together with the pitch angles at which the blades of the rotor are set controls the direction and intensity of its thrust and discharge of the jet from the rear end of the discharge tube 10 controls the direct forward thrust. The aircraft may thus be caused to be raised or lowered and driven forwardly, rearwardly, to one side or the other, or allowed to hover in a stationary position relative to the ground. By shutting off flow of fluid through the pipe 15 driving force is cut off from the blades and the aircraft may be propelled forwardly in the same manner as a jet plane which is not of the helicopter type and autorotate or glide to a landing.

Abutting ends of the shank sections 41 and 42 are surrounded by outstanding flanges 43 which are connected with each other by a hinge 44 in order that the blades may be swung from the extended position for use to a folded position and thus reduce to a minimum the storage space necessary for the aircraft. Bolts, not shown, passed through the flanges, or other suitable fastener means will be employed for releasably securing the blades extended. The socket 40 is enlarged circumferentially to form an internal annularly extending recess 40' in which a packing ring 45 is fitted to form a tight joint about the head 39 of the stub shaft or inner section 35 and in order to hold the packing ring in place and compress it about the head, there has been provided a nut 46 screwed upon the socket and overlapping the outer end edge of the packing ring.

Pins 47 are passed through threaded openings in the wall of the recessed portion of enlargement 40' and through the packing ring and at their inner ends fit into slotted grooves 48 formed in the head or joint 39. The shanks or sections 35, 41 and 42 may thus be disposed in axial alignment with the stub shafts of hub 32 of the rotor and moved to angularly adjusted positions. The heads 39 and the cups or sockets into which they fit form ball and socket joints providing limited universal tilting adjustment of the blades, as indicated by the dot and dash lines 49 shown in Figures 4 and 5.

The blades must be turned about their longitudinal axes in order to obtain pitch adjustment, and in order to conveniently do so the inner sections 35 are provided with arms 50 having clamps 51 at their inner ends secured tightly about the said inner sections. These arms are L-shaped and project outwardly from the inner sections 35 radially thereof and then longitudinally of the inner sections in spaced parallel relation thereto and at their outer ends are formed with spherical heads 50' with which are pivotally connected upper ends of links 52.

Vertical movement is imparted to the links 52 to turn the inner sections and adjust the pitch of the blades by a swash-plate 53 which is shown in Figures 8 and 9 and has the form of a universally mounted ball bearing, the inner race 54 of this bearing carrying upwardly projecting arms 55 with which lower ends of the links 52 are pivotally connected by ball and socket joints. The outer race 56 of the ball bearing has secured thereto an arm 57 and another arm 57' at right angles to arm 57 which are connected with a cyclic or differential pitch-control lever 58 by linkage 58' and as the lever is mounted for universal tilting movement it may be moved forward, backward, to the right, or to the left and the tubular sections turned for selective pitch adjustment of the blades.

The swashplate or bearing 53 may be raised or lowered to effect a simultaneous or collective change of blade pitch by means of a collective pitch lever 59 which is connected by linkage 60 with a lever 61 pivoted to a bracket 62 carried by the neck 16. The lever 61 has forks 63 which straddle the neck 16 and are pivoted to diametrically opposite portions of a collar 63' which fits about a sleeve 63". The sleeve 63" fits about a sleeve 64 surrounding and secured to the shank 34 of the rotor head 32. The sleeve 63" is mounted in the inner ring 65 of the swashplate and the sleeve 63" is splined to the sleeve 64 so that while it turns with the rotor it may be shifted vertically along the sleeve 64. When the collar 63' is shifted vertically the two blades are simultaneously turned and their pitch adjusted.

When the improved aircraft is in use, the engine is started and air is sucked in through the inlet 9 while the exhausting fluid forming the propelling jet and the steering jets is discharged through the tube 10. With the valve 17 open and the valve 12 closed all of the exhaust gases, except that required for steering, will be transmitted through the rotor head and the tubes 29 to the outer ends of the blades where it is discharged through the bent end portions or nozzles of the tubes and causes the rotor to revolve at such speed as may be desired by the operator of the aircraft, the said speed being controlled by increasing or reducing the speed at which the engine operates.

With the valve 17 still open and the valve 12 closed, the aircraft can be operated as a helicopter by manipulation of the cyclic pitch control lever 58, the collective pitch control lever 59, and the steering bar or foot lever 27. Stability and control of the aircraft about all three axes is thus obtained. During forward flight, with the aircraft operating as a helicopter, the horizontal component of the rotor thrust producing forward movement is small. As the speed of forward movement increases the fixed wings 3 come into play and to some extent relieve the load on the rotor, but since the forward speed is limited on account of the rotor thrust, the full effectiveness of the fixed wings is not realized.

With the aircraft in forward flight, as above described, conversion to the principle of a fixed-wing aircraft is easily accomplished by slowly moving the lever 21 forwardly. This movement of the lever slowly closes valve 17 and at the same time opens valve 12. The exhaust gases discharged from the rear end of the fuselage through the discharge pipe 10 produces a forward thrust, and this thrust in combination with the fixed wings 3 will produce much higher speeds than is possible with the helicopter. As the forward speed increases the loading of the rotor is greatly reduced and this reduction in loading is effective in delaying the stall of the retreating blades of the rotor. During this forward speed, stability and control of the aircraft about all three axes is still obtainable as before by the use of the cyclic pitch, collective pitch, and steering levers.

To produce even greater direct forward thrust from exhaust gases discharged from the pipe 10 fuel may be spread over the afterburner grid 14. The effect of this is to increase the temperature of the exhaust gases and thereby the corresponding volume, velocity, and thrust of the jet discharged back of the aircraft.

When the pipe 10 has its rear end opening through the rear end of the engine chamber, as shown in Figure 13, the jet is discharged above the fuselage instead of from the rear end thereof, and control of the exhaust gases to the rotor or the rear is accomplished by the single double acting valve 17 by shifting lever 21 as before. In such an arrangement of parts the aircraft is not steered by jets discharged from opposite sides of the rear end or tail of the fuselage through tubes or branches 22 and 23. It is therefore necessary to provide a vertical rudder 66 pivotally mounted for transverse movement at the rear end of the vertical stabilizer 67 by hinges 68.

This stabilizer 67 is longer than the stabilizer 7 of Fig. 2 and projects rearwardly from the fuselage and meeting edges of the stabilizer and the rudder are cut diagonally, as shown in Figure 12, so that a good steering action may be obtained, utilizing the airstream in form and flight conditions or the downwash of the rotor in hovering or vertical flight conditions. The usual horns 69 project from opposite sides of the rudder and to them are attached steering cables or lines 70 which extend longitudinally of the fuselage and have front end connection with the usual steering bar.

Obviously minor changes may be made in the preferred embodiments of my invention without departing from the essence of the invention and it is therefore understood that the specific embodiments shown and described are illustrative of the invention and not restrictive and that changes in construction and arrangement of parts may be made within the scope of the claims.

Having thus described the invention, what is claimed is:

1. In an aircraft comprising a fuselage, a helicoptor rotor located over said fuselage, said rotor comprising a tubular head, said head supporting airfoils and having a depending tubular post, said aircraft having an upright tubular standard on said fuselage receiving said tubular post mounted for rotation therein, said head having tubular radial shank portions and sections axially connected thereto, said sections comprising an inner section, an intermediate section and an outer section, all of said selections being tubular, said inner section being swivelly connected to a radial shank portion, said intermediate section being movably connected to said inner section by a universal joint construction, said joint construction having means therein to limit its movement, said intermediate section being connected to the outer section by a flanged joint hinged at one side for folding purposes, said air foils comprising blades integrally connected to said outer sections, an arm clamped to each inner section and extending laterally therefrom and then inwardly and longitudinally thereof, said blades having tubular portions terminating in suitably arranged trailing jet means on said blades, in further combination with jet engine means mounted in said fuselage and having a main tubular member leading therefrom and having two tubular branches connected thereto, one of said branches being connected to said head through the medium of said standard and post, the other branch being connected to the after part of said fuselage, said last named branch having steering tubes leading laterally therefrom and extending respectively through the opposite sides of said fuselage for steering purposes, a three-way valve in said last named branch for controlling the fluid feed to the steering tubes, a valve in the branch leading to said head, both of said valves being respectively provided with manipulating mechanism under direct control of the pilot.

2. The construction set forth in claim 1 in which the aircraft is provided with a single double acting valve for controlling the exhaust gases to the rotor or to the rear of the aircraft.

3. In an aircraft comprising a combined helicopter and airplane, a fuselage having a dome, a jet propulsion plant in said dome, jet fluid conducting means connected to said plant, said helicopter and said plane for propelling said holicopter and said plane, jet steering tubes connected to said jet conducting means whereby said aircraft may be guided and turned to the right or left as conditions require, control valves in said conducting means and in the path of said steering tubes, said control valves being respectively provided with mechanism arranged for direct control by the pilot.

4. In an aircraft comprising a fuselage having a dome, a helicopter rotor supported over said dome by a hollow standard extending upwardly from said dome, said rotor having a depending hollow post extending into said standard and being rotatably supported therein and connected thereto, the upper end of said rotor terminating in a hollow head having horizontal shank portions extending radially therefrom, said rotor having hollow airfoils constituting blades, said blades having jets in the trailing edges thereof and in the outer ends of the same, each blade being connected by a plurality of hollow sections, said sections comprising an inner section, an outer section and an intermediate section, said inner section being swivelly and coaxially connected at one end to one horizontal shank portion and connected at its outer end to the intermediate section by a universal joint construction, said joint construction having means therein to limit the movement relatively of said inner section and said intermediate section, the outer end of said intermediate section terminating in an outwardly extending annular flange hinged to a like flange of the outer section, said outer section being integral with the blade, said blade and its section being foldable for compactness when the aircraft is located in a compact protective shelter.

5. The construction set forth in claim 4, in which said inner section is provided with an arm extending radially therefrom and then horizontally thereof toward said post, said arm having a circular clamp surrounding said inner section and clamped thereon whereby said blade may be adjustably tilted about its longitudinal axis for selective pitch adjustment.

6. In an aircraft comprising a fuselage having a dome, a helicopter rotor located above said dome, a tubular standard extending upwardly from said dome and secured thereto, said rotor having a tubular head, said head supporting airfoils and having a depending rotatable tubular post swiveled in said standard and connected thereto, said head having tubular shank portions extending radially therefrom and a plurality of tubular sections connected axially to each shank portion, said sections comprising an inner section, an intermediate section, and an outer section, said outer section being integral with a rotor airfoil, said airfoils being tubular and defining nonsymmetrical tubes, said airfoils being reinforced by transversely arranged webs located longitudinally within said airfoils and secured thereto.

References Cited in the file of this patent

UNITED STATES PATENTS

| | | |
|---|---|---|
| 1,877,902 | Kuethe | Sept. 20, 1932 |
| 2,396,130 | Sbrilli | Mar. 5, 1946 |
| 2,429,646 | Pullin | Oct. 28, 1947 |
| 2,596,435 | Robert | May 13, 1952 |
| 2,606,622 | Bates | Aug. 12, 1952 |

FOREIGN PATENTS

| | | |
|---|---|---|
| 627,117 | Great Britain | July 28, 1949 |
| 928,469 | France | June 2, 1947 |
| 931,296 | France | Oct. 6, 1947 |